(12) United States Patent
Tanaka et al.

(10) Patent No.: US 9,800,062 B2
(45) Date of Patent: Oct. 24, 2017

(54) POWER SUPPLY SYSTEM AND RESONANCE CIRCUIT

(71) Applicant: Yazaki Corporation, Tokyo (JP)

(72) Inventors: Shingo Tanaka, Yokosuka (JP);
Kazuyoshi Kagami, Susono (JP);
Hajime Terayama, Susono (JP);
Kiyoshi Katou, Susono (JP)

(73) Assignee: Yazaki Corporation, Tokyo (JP)

( * ) Notice: Subject to any disclaimer, the term of this patent is extended or adjusted under 35 U.S.C. 154(b) by 243 days.

(21) Appl. No.: 14/925,124

(22) Filed: Oct. 28, 2015

(65) Prior Publication Data
US 2016/0049800 A1 Feb. 18, 2016

Related U.S. Application Data

(63) Continuation of application No. PCT/JP2014/061690, filed on Apr. 25, 2014.

(30) Foreign Application Priority Data

Apr. 30, 2013 (JP) .................................. 2013-095023

(51) Int. Cl.
*H01F 27/42* (2006.01)
*H02J 5/00* (2016.01)
(Continued)

(52) U.S. Cl.
CPC ............. *H02J 5/005* (2013.01); *B60L 11/182* (2013.01); *B60L 11/1861* (2013.01);
(Continued)

(58) Field of Classification Search
None
See application file for complete search history.

(56) References Cited

U.S. PATENT DOCUMENTS

| 2010/0270970 | A1 | 10/2010 | Toya et al. | |
|---|---|---|---|---|
| 2012/0235508 | A1* | 9/2012 | Ichikawa | H02J 5/005 307/104 |
| 2015/0008755 | A1* | 1/2015 | Sone | H02J 7/025 307/104 |

FOREIGN PATENT DOCUMENTS

| JP | 2010-263663 A | 11/2010 |
|---|---|---|
| JP | 2011-217596 A | 10/2011 |

(Continued)

OTHER PUBLICATIONS

International Search Report dated Jul. 22, 2014, issued for PCT/JP2014/061690.

(Continued)

*Primary Examiner* — Cassandra Cox
(74) *Attorney, Agent, or Firm* — Locke Lord LLP

(57) ABSTRACT

Primary and secondary resonance circuits and include primary and secondary resonance coils and primary and secondary capacitors, respectively. Non-contact power supply is conducted by electromagnetic resonance of the primary and secondary resonance circuits and. A changeover circuit changes over connection of the secondary resonance coil and the secondary capacitor to a series connection or a parallel connection. A detection circuit detects impedance on a power receipt side. A changeover control circuit controls changeover conducted by the changeover circuit, depending upon the impedance detected by the detection circuit.

4 Claims, 3 Drawing Sheets

(51) Int. Cl.
*B60L 11/18* (2006.01)
*H02J 17/00* (2006.01)
*H02J 7/02* (2016.01)
*H02J 50/12* (2016.01)

(52) U.S. Cl.
CPC ......... *H02J 17/00* (2013.01); *B60L 2240/547* (2013.01); *H02J 7/025* (2013.01); *H02J 50/12* (2016.02); *Y02T 10/7005* (2013.01); *Y02T 10/705* (2013.01); *Y02T 10/7044* (2013.01); *Y02T 10/7072* (2013.01); *Y02T 90/122* (2013.01); *Y02T 90/14* (2013.01)

(56) References Cited

FOREIGN PATENT DOCUMENTS

| | | |
|---|---|---|
| JP | 2012-135117 A | 7/2012 |
| JP | 2012-156281 A | 8/2012 |
| JP | 2014-064446 A | 4/2014 |

OTHER PUBLICATIONS

Office Action dated May 16, 2017, issued for the corresponding Japanese patent application No. 2013-095023 and English translation thereof.

\* cited by examiner

| | EQUIVALENT CIRCUIT | CIRCUIT CONFIGURATION |
|---|---|---|
| S/S TYPE | | PRIMARY SIDE : SERIES RESONANCE CIRCUIT<br>SECONDARY SIDE : SERIES RESONANCE CIRCUIT |
| S/P TYPE | | PRIMARY SIDE : SERIES RESONANCE CIRCUIT<br>SECONDARY SIDE : PARALLEL RESONANCE CIRCUIT |
| P/S TYPE | | PRIMARY SIDE : PARALLEL RESONANCE CIRCUIT<br>SECONDARY SIDE : SERIES RESONANCE CIRCUIT |
| P/P TYPE | | PRIMARY SIDE : PARALLEL RESONANCE CIRCUIT<br>SECONDARY SIDE : PARALLEL RESONANCE CIRCUIT |

FIG.1

POWER SUPPLY SYSTEM AND RESONANCE CIRCUIT

TECHNICAL FIELD

The present invention relates to a power supply system. In particular, the present invention relates to a power supply system and a resonance circuit including a pair of resonance coils configured to conduct non-contact power supply by magnetic field resonance and a capacitor connected to at least one resonance coil in the pair of resonance coils.

BACKGROUND ART

In recent years, attention has been paid to wireless power supply, which does not use a power supply cord and a power transmission cable, as a power supply system that supplies power to a battery mounted on a hybrid automobile or an electric automobile. As one of techniques of the wireless power supply, a technique of resonance type is known (Patent Literatures 1 and 2).

The power supply system of resonance type includes a resonance circuit on a power supply side and a resonance circuit on a power receipt side disposed to be separated from each other. Each of the resonance circuit on the power supply side and the resonance circuit on the power receipt side includes a resonance coil and a capacitor connected to the resonance coil. Two kinds of resonance circuit are known, i.e., a series resonance circuit including a resonance coil and a capacitor connected in series and a parallel resonance circuit including a resonance coil and a capacitor connected in parallel.

A resonance frequency f of the resonance circuit on the power supply side and the resonance circuit on the power receipt side is represented by the following Equation (1), where L is inductance of the resonance coil, and C is capacitance of the capacitor.

$$f = 1/(2\pi \operatorname{sqrt}(LC)) \quad (1)$$

Non-contact power transmission from the power supply side to the power receipt side is implemented by causing the resonance circuit on the power supply side and the resonance circuit on the power receipt side to resonate.

CITATION LIST

Patent Literatures

Patent Literature 1: JP 2011-217596 A
Patent Literature 2: JP 2012-156281 A

SUMMARY OF INVENTION

Technical Problem

In the above-described conventional technique, there is a problem that a power transmission efficiency from the power supply side to the power receipt side is not sufficient.

Therefore, it is an object of the present invention to provide a power supply system improved in power transmission efficiency and a resonance circuit used in the power supply system.

Solution to Problem

As a result of their eager research, the present inventors found that the connection of the resonance coil and the capacitor (series connection or parallel connection) in which the power transmission efficiency becomes high changes depending upon impedances of the power supply side and the power receipt side, thus leading to the present invention.

That is, the invention described in a first aspect lies in a power supply system including a pair of resonance circuits, each of the resonance circuits including a resonance coil and a capacitor connected to the resonance coil, non-contact power supply being conducted by electromagnetic resonance in the pair of resonance circuits, the power supply system including changeover unit configured to change over a connection of the resonance coil and the capacitor to a series connection or a parallel connection.

The invention described in a second aspect lies in the power supply system according to the first aspect, including: detector configured to detect impedance on a power supply side or a power receipt side; and changeover controller configured to control changeover in the changeover unit depending upon impedance detected by the detector.

The invention described in a third aspect lies in the power supply system according to the second aspect, wherein the detector detects impedance on the power receipt side by detecting a charging state of a battery supplied with power from the resonance circuit on the power receipt side included in the pair of resonance circuits.

The invention described in a fourth aspect lies in the power supply system according to the second or third aspect, wherein, in a case where the impedance detected by the detector is lower than a predetermined value, changeover controller changes over to the series connection, and in a case where the impedance detected by the detector is at least the predetermined value, the changeover controller changes over to the parallel connection.

The invention described in a fifth aspect lies in a resonance circuit used in a power supply system that conducts non-contact power supply by using magnetic field resonance, the resonance circuit including a resonance coil and a capacitor connected to the resonance coil, the resonance circuit including changeover unit configured to change over a connection of the resonance coil and the capacitor to a series connection or a parallel connection.

Advantageous Effects of Invention

As described heretofore, according to the invention described in the first and fifth aspects, changeover unit configured to change over the connection of the resonance coil and the capacitor between the series connection and the parallel connection is provided. Therefore, it is possible to conduct changeover to a connection that is high in power transmission efficiency depending upon impedances on the power supply side and the power receipt side. As a result, the power transmission efficiency can be improved.

According to the invention described in the second aspect, changeover controller controls the changeover in the changeover unit depending upon the impedance detected by detector. Therefore, even if the impedance on the power supply side or the power receipt side varies, it is possible to conduct changeover to a connection that is high in power transmission efficiency depending upon the impedance that has varied. As a result, the power transmission efficiency can be improved.

According to the invention described in the third aspect, it is possible to detect variation of the impedance on the power receipt side depending upon the variation of the charging state of the battery.

According to the invention described in the fourth aspect, it is possible to conduct changeover to a connection that is high in power transmission efficiency depending upon the impedances on the power supply side and the power receipt side. As a result, the power transmission efficiency can be improved.

BRIEF DESCRIPTION OF DRAWINGS

FIG. 1 is a diagram used to describe connection patterns of a resonance circuit on a power supply side and the resonance circuit on a power receipt side in a conventional power supply system.

DESCRIPTION OF EMBODIMENTS

Figure 2:
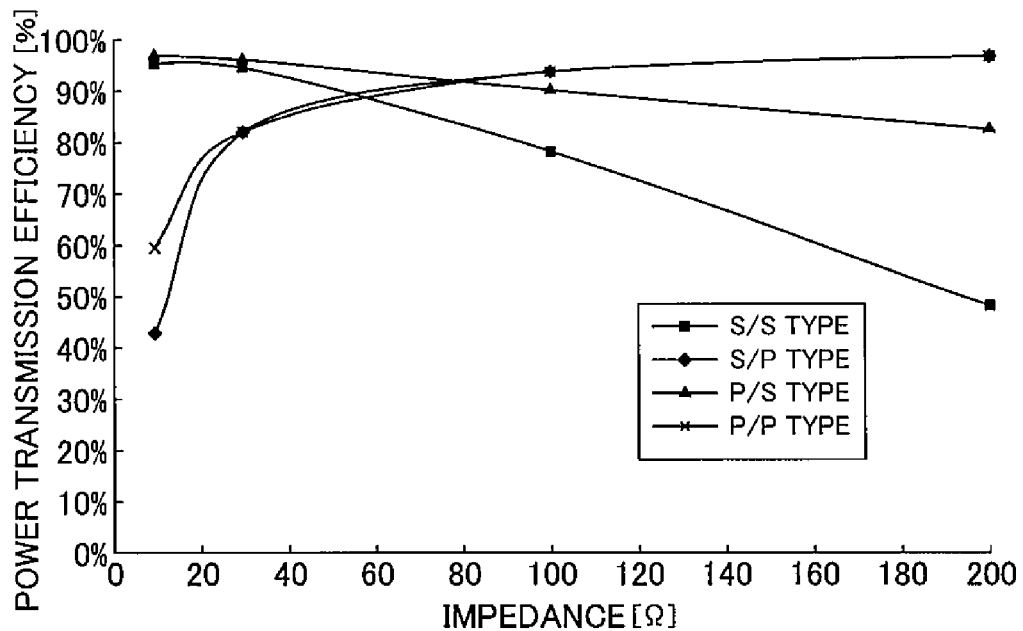
FIG. 2 is a graph illustrating a result obtained by conducting simulation on power transmission efficiency as a function of impedance by varying impedances on both a primary side and a secondary side in power supply systems of an S/S type, an S/P type, a P/S type and a P/P type.

Before describing a power supply system according to the present invention, a configuration of a conventional power supply system will be described with reference to FIG. 1. As illustrated in FIG. 1, a power supply system 1 includes a primary (power receipt side) resonance circuit 2 and a secondary resonance circuit 3. The primary resonance circuit 2 is mounted on the ground or the like of power supply facilities having an alternating current (AC) power supply V. The primary resonance circuit 2 supplies power from the AC power supply V without contact. The secondary resonance circuit 3 is mounted on a vehicle to receive power from the primary resonance circuit 2 without contact and supply power to a load L.

The primary resonance circuit 2 includes a primary resonance coil Co1 and a primary capacitor Ca1 connected to the primary resonance coil Co1. The primary resonance coil Co1 is equivalent to a resonance coil in claims. The primary capacitor Ca1 is equivalent to a capacitor in the claims.

The secondary resonance circuit 3 includes a secondary resonance coil Co2 and a secondary capacitor Ca2 connected to the secondary resonance coil Co2. The secondary resonance coil Co2 is equivalent to a resonance coil in claims. The secondary capacitor Ca2 is equivalent to a capacitor in claims. The primary resonance circuit 2 and the secondary resonance circuit 3 are provided to have equal resonance frequencies.

According to the above-described power supply system 1, if an AC current having a resonance frequency is supplied from the AC power supply V to the primary resonance circuit 2, the primary resonance coil Co1 and the primary capacitor Ca1 resonate. As a result, the primary resonance circuit 2 and the secondary resonance circuit 3 conduct magnetic field resonance. Power is transmitted from the primary resonance circuit 2 to the secondary resonance circuit 3 in a wireless form. Power is supplied to a load L connected to the secondary resonance circuit 3.

As for the above-described primary and secondary resonance circuits 2 and 3, two kinds, i.e., a series resonance circuit and a parallel resonance circuit are known. In the series resonance circuit, the primary resonance coil Co1 or the secondary resonance coil Co2 and the primary capacitor Ca1 or the secondary capacitor Ca2 are connected in series. In the parallel resonance circuit, the primary resonance coil Co1 or the secondary resonance coil Co2 and the primary capacitor Ca1 or the secondary capacitor Ca2 are connected in parallel.

Hereafter, a system in which both the primary resonance circuit 2 and the secondary resonance circuit 3 are series resonance circuits as illustrated in FIG. 1 is referred to as an S (Series)/S type. A system in which the primary resonance circuit 2 is the series resonance circuit and the secondary resonance circuit 3 is the parallel resonance circuit is referred to as an S/P (Parallel) type. A system in which the primary resonance circuit 2 is the parallel resonance circuit and the secondary resonance circuit 3 is the series resonance circuit is referred to as a P/S type. A system in which both the primary resonance circuit 2 and the secondary resonance circuit 3 are parallel resonance circuits is referred to as a P/P type.

The present inventors conducted simulation on the power transmission efficiency as a function of impedance by varying impedances on both the primary side and the secondary side in the power supply system 1 of the above-described S/S type, S/P type, P/S type, and P/P type. At this time, impedances on the primary side and the secondary side are set to the same value. The result is illustrated in FIG. 2.

As illustrated in FIG. 2, the power transmission efficiency in the S/S type keeps a high value of approximately 95% in a low impedance region in the range of 10 to 25Ω. If the impedance becomes at least 25Ω, the power transmission efficiency falls as the impedance becomes higher. The power transmission efficiency in the S/P type keeps a high value of more than 90% in a high impedance region in the range of 60 to 200Ω. If the impedance becomes 60Ω or less, the power transmission efficiency falls as the impedance becomes lower.

The power transmission efficiency in the P/S type keeps a high value of approximately 95% in a low impedance region in the range of 10 to 25Ω. If the impedance becomes at least 25Ω, the power transmission efficiency falls as the impedance becomes higher. The power transmission efficiency in the P/P type keeps a high value of at least 90% in a high impedance region in the range of 60 to 200Ω. If the impedance becomes 60Ω or less, the power transmission efficiency falls as the impedance becomes lower.

In other words, with impedance of 80Ω taken as a boundary, the S/S type or the P/S type gives a high transmission efficiency at low impedance whereas the P/P type or the S/P type gives a high transmission efficiency at high impedance. At the resonant frequency, impedance becomes zero in series resonance, whereas impedance becomes infinity in parallel resonance. Therefore, it is considered that impedance matching is facilitated in a series resonance circuit at low impedance whereas impedance matching is facilitated in a parallel resonance circuit at high impedance.

Comparing the S/S type with the P/S type, the difference is slight in a case where the impedance is low. If the impedance becomes high, however, the efficiency falls in the S/S type. This is also considered because if the impedance is high, infinity impedance at the time of parallel resonance is taken easily as described above.

As described above, the present inventors have found that the connection (series connection or parallel connection) of the primary and secondary resonance circuits 2 and 3 that makes the power transmission efficiency high changes according to the impedances of the primary side and the secondary side.

Then, the present inventors have changed only the secondary side impedance with the primary side impedance fixed to 0Ω in the above-described power supply system 1 of S/S type, S/P type, P/S type and P/P type. A result of simulation of the power transmission efficiency as a function of impedance variation is illustrated in FIG. 3.

Figure 3:
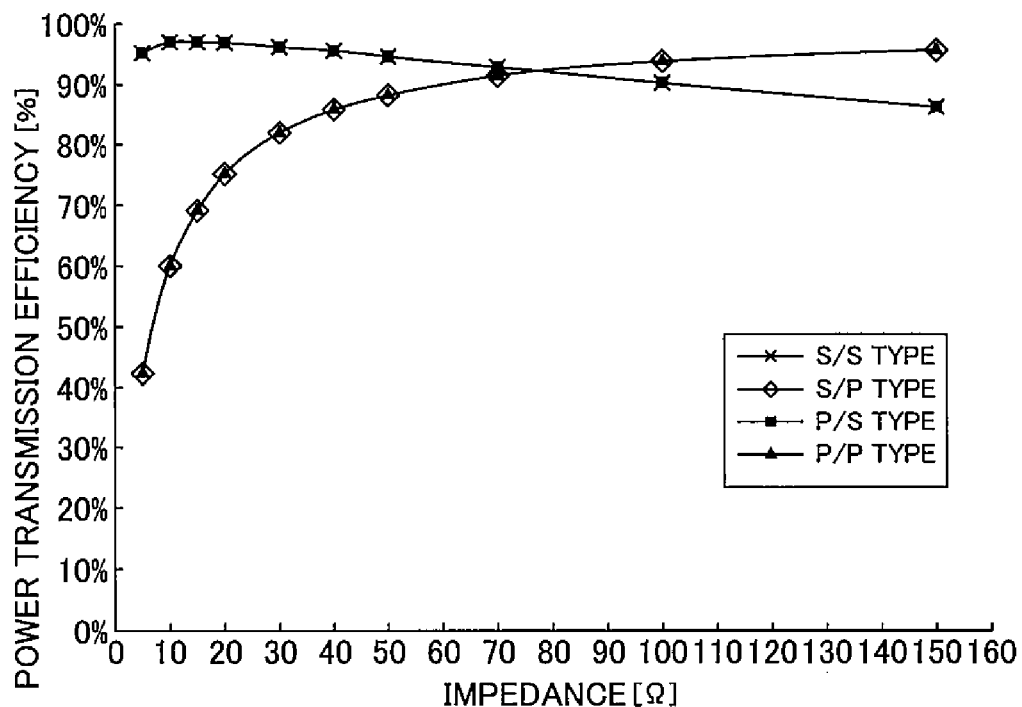
FIG. 3 is a graph illustrating a result obtained by conducting simulation on the power transmission efficiency as a function of impedance by fixing a primary impedance to 10Ω and varying a secondary side impedance in the power supply systems of S/S type, S/P type, P/S type and P/P type.

Unlike the case illustrated in FIG. 2, it has been found that there is little difference between the S/S type and the P/S type and between the S/P type and the P/P type in the case illustrated in FIG. 3. In other words, when the secondary impedance is approximately 80Ω or less, the S/S type and the P/S type are higher in transmission efficiency than the S/P type and the P/P type. When the secondary impedance is at least 80Ω, however, the S/P type and the P/P type are higher in transmission efficiency than the S/S type and the P/S type.

It is found from the above-described results that the transmission efficiency can be improved if circuit types of four kinds are made selectable according to variation values of the primary and secondary impedances. Specifically, the transmission efficiency can be improved by changing over to the S/S type or the P/S type in a case where the power supply system 1 is provided in an application of low impedance. The transmission efficiency can be improved by changing over to the S/P type or the P/P type in a case where the power supply system 1 is provided in an application of high impedance.

Supposing charging to an electric automobile or a hybrid automobile, power is supplied to a battery such as a secondary battery or an electric double layer capacitor represented by a Li ion battery functioning as a load L. Impedance of the battery changes depending upon an SOC (state of charging) thereof (If the SOC is high, the impedance becomes high. If the SOC is low, the impedance becomes low.).

Therefore, it is found that if, for example, the SOC is high and the impedance on the secondary side is at least 80Ω, the S/P type can be made higher in power transmission efficiency than the S/S type. It is also found that if the impedance on the secondary side is 80Ω or less, the S/S type can be made higher in power transmission efficiency than the S/P type.

Therefore, the present inventors have devised the power supply system 1 in which changeover between the S/P type and the S/S type is conducted depending upon the impedance on the secondary side. Hereafter, the power supply system 1 according to the present invention will be described with reference to FIG. 4.

Figure 4:
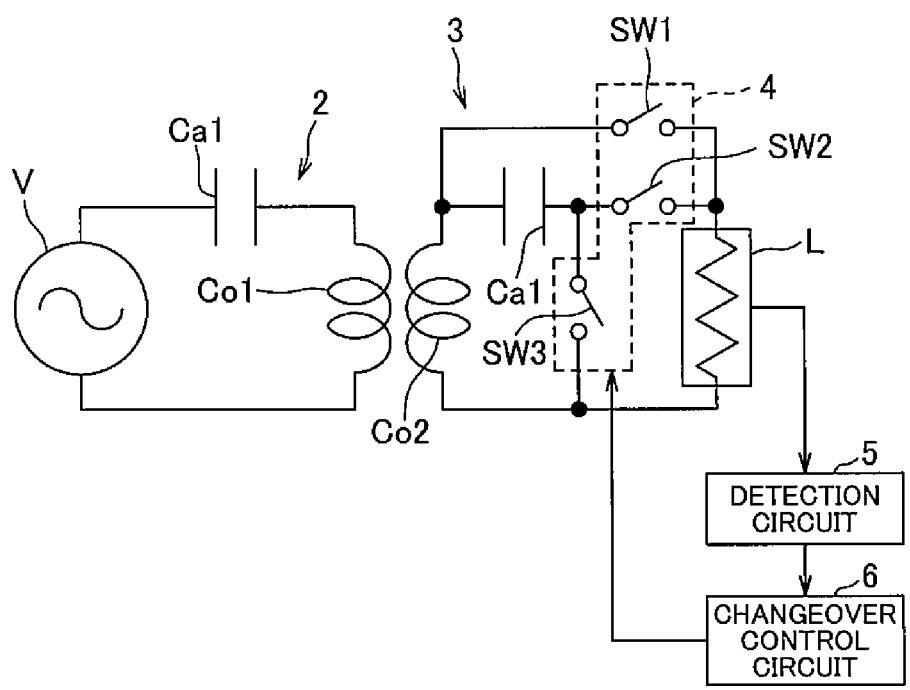
FIG. 4 is a circuit diagram illustrating an embodiment of a power supply system according to the present invention.

As illustrated in FIG. 4, the power supply system 1 includes a primary resonance circuit 2 and a secondary resonance circuit 3 in the same way as the conventional power supply system illustrated in FIG. 1. In the primary resonance circuit 2, a primary resonance coil Co1 and a primary capacitor Ca1 are connected in series to form a series resonance circuit. The secondary resonance circuit 3 includes a secondary resonance coil Co2 and a secondary capacitor Ca2 connected to the secondary resonance coil Co2. A load L supplied with power from the secondary resonance circuit 3 is a battery such as, for example, a secondary battery or a capacitor.

Furthermore, the power supply system 1 includes: a changeover circuit 4 functioning as changeover unit configured to change over the connection of the secondary resonance coil Co2 and the secondary capacitor Ca2 to a series connection or a parallel connection; a detection circuit 5 functioning as detector configured to detect impedance on the secondary side from a charging state of the load L, which is the battery; and a changeover control circuit 6 functioning as changeover controller configured to control changeover in the changeover circuit 4 depending upon the impedance detected by the detection circuit 5.

In the secondary resonance circuit 3, the secondary resonance coil Co2 and the secondary capacitor Ca2 are connected in series. The changeover circuit 4 includes a switch SW1 connected in parallel with the secondary capacitor Ca2, a switch SW2 provided between the secondary capacitor Ca2 and the load L, and a switch SW3 connected in series with the load L.

In the configuration described heretofore, the secondary resonance circuit 3 becomes a series resonance circuit by turning off the switches SW1 and SW3 and turning on the switch SW2 as shown in Table 1. The secondary resonance circuit 3 becomes a parallel resonance circuit by turning on the switches SW1 and S3 and turning off the switch S2. The switches SW1 to SW3 include, for example, semiconductor switches.

TABLE 1

|  | SW1 | SW2 | SW3 |
|---|---|---|---|
| S/S TYPE | OFF | ON | OFF |
| S/P TYPE | ON | OFF | ON |

The detection circuit 5 detects a voltage across the battery, which is the load L, to detect the charging state. Inductance of the secondary resonance coil Co2 and capacitance of the secondary capacitor Ca2 are already known and they do not vary. Therefore, if the charging state of the battery can be detected, impedance of the whole secondary side can be found.

The changeover control circuit 6 includes, for example, a microcomputer. The changeover control circuit 6 controls on/off of the switches S1 to S3 depending upon the impedance detected by the detection circuit 5.

Hereafter, operation of the power supply system 1 having the above-described configuration will be described. Upon detecting, for example, approach of a vehicle to the power supply facilities or power supply from the primary resonance circuit 2, the changeover control circuit 6 controls the detection circuit 5 to cause the detection circuit 5 to detect the charging state of the battery to detect the impedance of the secondary side. Then, if the detected impedance on the power receipt side is lower than, for example, 80Ω (predetermined value), the changeover control circuit 6 turns on the switches SW1 and SW3 and turns off the switch SW2 to change over the secondary resonance circuit 3 to a parallel resonance circuit.

On the other hand, if the detected impedance on the power receipt side is at least, for example, 80Ω, the changeover control circuit 6 turns off the switches SW1 and SW3 and turns on the switch SW2 to change over the secondary resonance circuit 3 to a series resonance circuit. In the present embodiment, a predetermined value in claims is set to 80Ω. However, this is an example, and the predetermined value is set suitably depending upon the power supply system 1 to which the present invention is applied.

According to the above-described embodiment, the changeover control circuit 6 controls the changeover circuit 4 to change over the secondary resonance circuit 3 between parallel resonance and series resonance depending upon the impedance detected by the detection circuit 5. Therefore, even if the impedance on the power receipt side varies due to variation of the charging state of the battery, it is possible to conduct changeover to a connection of high power transmission efficiency depending upon the impedance that has varied. As a result, the power transmission efficiency can be improved.

According to the above-described embodiment, the detection circuit 5 detects the impedance on the secondary side by detecting the charging state of the battery supplied with power from the secondary resonance circuit 3. Therefore, it is possible to detect variation of the impedance on the power receipt side depending upon variation of the charging state of the battery.

According to the above-described embodiment, the changeover circuit 4 is provided only in the secondary resonance circuit 3 to change over between the S/S type and the S/P type. However, the present invention is not restricted to this. For example, changeover may be conducted between the P/S type and the P/P type. Furthermore, the changeover circuit 4 may be provided in both the primary resonance circuit 2 and the secondary resonance circuit 3 to change over between the S/S type and the P/P type and change over between the P/S type and the S/P type.

According to the above-described embodiment, the detection circuit 5 detects the impedance on the power receipt side from the charging state of the battery. However, the present invention is not restricted to this. The impedance may be detected by using another method.

According to the above-described embodiment, the changeover circuit 4 is changed over depending upon the impedance on the power receipt side. However, the present invention is not restricted to this. If there is an element that varies in impedance on the power supply side, the changeover circuit 4 may be changed over depending upon the impedance on the power supply side.

According to the above-described embodiment, the changeover circuit 4 is changed over depending upon the detected impedance. However, the present invention is not restricted to this. In a case of the power supply system 1 that is slight in variation of the impedance, the changeover circuit 4 may be controlled to establish a connection suitable for impedances on the primary side and the secondary side predetermined at the time when mounting the power supply system 1, without detecting impedance.

According to the above-described embodiment, the primary resonance circuit 2 is supplied with power supply directly from the AC power supply V. However, the present invention is not restricted to this. For example, power supply may be supplied by using electromagnetic induction without contact. The load L is supplied with power supply directly from the secondary resonance circuit 3. However, the present invention is not restricted to this. For example, power supply may be supplied by using electromagnetic induction without contact.

The above-described embodiment is nothing but a representative form of the present invention. The present invention is not restricted to the embodiment. In other words, various modifications can be executed without departing from the spirit of the present invention.

REFERENCE SIGNS LIST

1 Power supply system
2 Primary resonance circuit (resonance circuit)
3 Secondary resonance circuit
4 Changeover circuit (changeover unit)
5 Detection circuit (detector)
6 Changeover control circuit (changeover controller)
Co1 Primary resonance coil (resonance coil)
Co2 Secondary resonance coil (resonance coil)
Ca1 Primary capacitor (capacitor)
Ca2 Secondary capacitor (capacitor)

The invention claimed is:

1. A power supply system including a pair of resonance circuits, each of the resonance circuits including a resonance coil and a capacitor connected to the resonance coil, in which a non-contact power supply is conducted by electromagnetic resonance in the pair of resonance circuits, the power supply system comprising:
   a changeover unit configured to change over a connection of the resonance coil and the capacitor to a series connection or to a parallel connection
   a detector configured to detect an impedance on a power supply side or a power receipt side; and
   a changeover controller configured to control a changeover in the changeover unit depending upon the impedance detected by the detector.

2. The power supply system according to claim 1, wherein the detector detects the impedance on the power receipt side by detecting a charging state of a battery supplied with power from the resonance circuit on the power receipt side included in the pair of resonance circuits.

3. The power supply system according to claim 1, wherein
   in a case where the impedance detected by the detector is lower than a predetermined value, changeover controller changes over to the series connection, and
   in a case where the impedance detected by the detector is at least the predetermined value, the changeover controller changes over to the parallel connection.

4. The power supply system according to claim 2, wherein
   in a case where the impedance detected by the detector is lower than a predetermined value, changeover controller changes over to the series connection, and
   in a case where the impedance detected by the detector is at least the predetermined value, the changeover controller changes over to the parallel connection.

* * * * *